(12) United States Patent
Huang et al.

(10) Patent No.: US 6,703,757 B2
(45) Date of Patent: Mar. 9, 2004

(54) MOTOR STRUCTURE HAVING LOW PROFILE

(75) Inventors: Wen-Shi Huang, Chungli (TW); Kuo-Cheng Lin, Taoyuan (TW); Ming-Shi Tsai, Taoyuan Hsien (TW); Chu Hsien Chou, Taoyuan Hsien (TW)

(73) Assignee: Delta Electronics Inc. (TW)

( * ) Notice: Subject to any disclaimer, the term of this patent is extended or adjusted under 35 U.S.C. 154(b) by 69 days.

(21) Appl. No.: 09/985,143

(22) Filed: Nov. 1, 2001

(65) Prior Publication Data

US 2002/0047474 A1 Apr. 25, 2002

Related U.S. Application Data

(63) Continuation-in-part of application No. 09/676,266, filed on Sep. 28, 2000, now Pat. No. 6,509,666.

(30) Foreign Application Priority Data

Dec. 20, 2000 (TW) .................................. 89113642A01 A

(51) Int. Cl.$^7$ ................................................. H02K 1/12
(52) U.S. Cl. ....................... 310/257; 310/194; 310/216; 310/254
(58) Field of Search ................................. 310/257, 194, 310/216, 268, 256, 259, 156.05, 258, 217, 218

(56) References Cited

U.S. PATENT DOCUMENTS

| | | | | |
|---|---|---|---|---|
| 1,622,261 A | * | 3/1927 | Payne ..................... | 192/84.91 |
| 3,312,842 A | * | 4/1967 | Heuchling et al. ............. | 310/17 |
| 3,437,897 A | * | 4/1969 | Lenny ......................... | 318/138 |
| 3,700,942 A | * | 10/1972 | Alth .......................... | 310/164 |
| 4,307,309 A | * | 12/1981 | Barrett ....................... | 310/166 |
| 4,585,979 A | * | 4/1986 | Sakamoto et al. .......... | 318/254 |
| 4,922,162 A | * | 5/1990 | Shiraki et al. .............. | 310/268 |
| 4,949,000 A | * | 8/1990 | Petersen .................... | 310/179 |
| 5,148,069 A | * | 9/1992 | Nonaka et al. ........... | 310/68 R |
| 5,406,157 A | * | 4/1995 | New ......................... | 310/90.5 |
| 6,388,346 B1 | * | 5/2002 | Lopatinsky et al. .......... | 310/63 |

* cited by examiner

*Primary Examiner*—Dang Le
(74) *Attorney, Agent, or Firm*—Birch, Stewart, Kolasch & Birch, LLP

(57) ABSTRACT

A motor structure is disclosed. The motor structure includes a stator and a rotor. Among these, the stator further includes a coil seat defined by a bottom plate, a plurality of first teeth and a plurality of second teeth. A coil is formed in the coil seat. The first teeth formed around inner periphery of the bottom plate and have a first extending portion extending so as to constitute a reversed L shape. The second teeth formed around outer periphery of the bottom plate and have a second extending portion so as to constitute a reversed L shape. The rotor, coupled to the stator, further have a circular magnet formed above the coil seat, the first extending portion and the second extending portion. Each of the first and second extending portions further includes a chamfer, a fillet, a clearance, a fold and different dimension.

12 Claims, 6 Drawing Sheets

MOTOR STRUCTURE HAVING LOW PROFILE

BACKGROUND OF THE INVENTION

The present invention is a continuation-in-part application of the parent application bearing Ser. No. 09/676,266 and filed on Sep. 28, 2000 now U.S. Pat. No. 6,509,666.

FIELD OF THE INVENTION

The present invention relates to a motor structure, and more particularly to a motor structure having lower profile.

DESCRIPTION OF THE PRIOR ART

Recently, electrical devices trend to be compact. For example, notebook computers are getting thinner and thinner. To meet the demand of compact electrical device, a fan having lower profile is required.

In developing the fan having lower profile, the most important problem is that the stator of the conventional motor cannot meet the requirement of the designer, and there are difficulties in manufacturing a stator having lower profile.

FIG. 1 is a partial cross-sectional view illustrating a conventional motor structure. FIG. 2 is a side view illustrating the conventional motor structure shown in FIG. 1. Referring to FIG. 1 and FIG. 2, the motor structure includes a magnetic ring 100 and a stator 200. The magnetic ring 100 is a part of a rotor (not completely shown). The stator 200 includes a silicon steel set 201 with four poles and a coil (wirings) 202 wound on the silicon steel set 201.

Since the silicon steel set 201 is composed of a plurality of silicon steel sheet stacked together, the edges of the silicon steel set 201 are sharp. Therefore, a film or cover (not shown) is needed to cover the silicon steel sheet 201 for winding the coil 202 without damaging them.

In the above-mentioned motor structure, the method of winding of the coil wastes a lot of space, that is, the coil cannot totally fill the circular area surrounded by the silicon steel set 201, deteriorating the performance of the motor.

In order to make the above-mentioned motor structure thin, there may occur the following effects:

(a) since the number of the silicon steel must be relatively small and the space for the winding is insufficient, the motor performance is relatively poor.

(b) since the size of the stator is relatively small and the tolerance is relatively strict, the difficulty level is increased in manufacturing and assembling the motor; and (c) since the edge of the silicon steel sheet of a thin stator are relatively sharp, the wirings wound thereon are easily damaged and short-circuit the coil.

In general, the stability of the operating motor depends on the number of poles of the motor. In the above-mentioned motor structure, the number of poles thereof is four. If the number of poles is increased to eight, undesirable problems occur. For example, difficulty in winding the wirings may occur. Also in a condition that seldom occurs, the motor may easily short out or the performance thereof will be poor.

SUMMARY OF THE INVENTION

Therefore, the main object of the present invention is to provide a motor structure having lower profile capable of improving the performance and facilitating the manufacturing processes.

The above object of the present invention is achieved by providing a motor structure including a stator having a coil seat, and a rotor having a circular magnet located above the coil seat. The coil seat is defined by a bottom plate, a plurality of first teeth and a plurality of second teeth. The first teeth are formed around the inner periphery of the bottom plate. The second teeth are formed around the outer periphery of the bottom plate. Each of the first teeth and the second teeth further includes a first extending portion and a second extending portion, respectively.

The motor structure further has a base for accommodating the coil seat. Alternatively, the coil seat is formed on an optional concavity of the base.

Furthermore, the stator further includes a shaft substantially perpendicular to, and fixed on the base. A ring-shaped groove is formed on the shaft. The rotor also includes a hub, a metal sheet, and a bearing. The metal sheet, arranged between the hub and the circular magnet, is used to avoid magnetic leakage. The shaft penetrates the bearing. The motor structure may further include an engagement ring and an elastic ring. The engagement ring is positioned on the bearing for fixing the bearing. The elastic ring is positioned in the ring-shaped groove for elastically fixing the bearing. The engagement ring and the elastic ring are used to fix the bearing so as to prevent the bearing and the shaft form separating along the axial direction of the shaft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The First Embodiment

Figure 1:
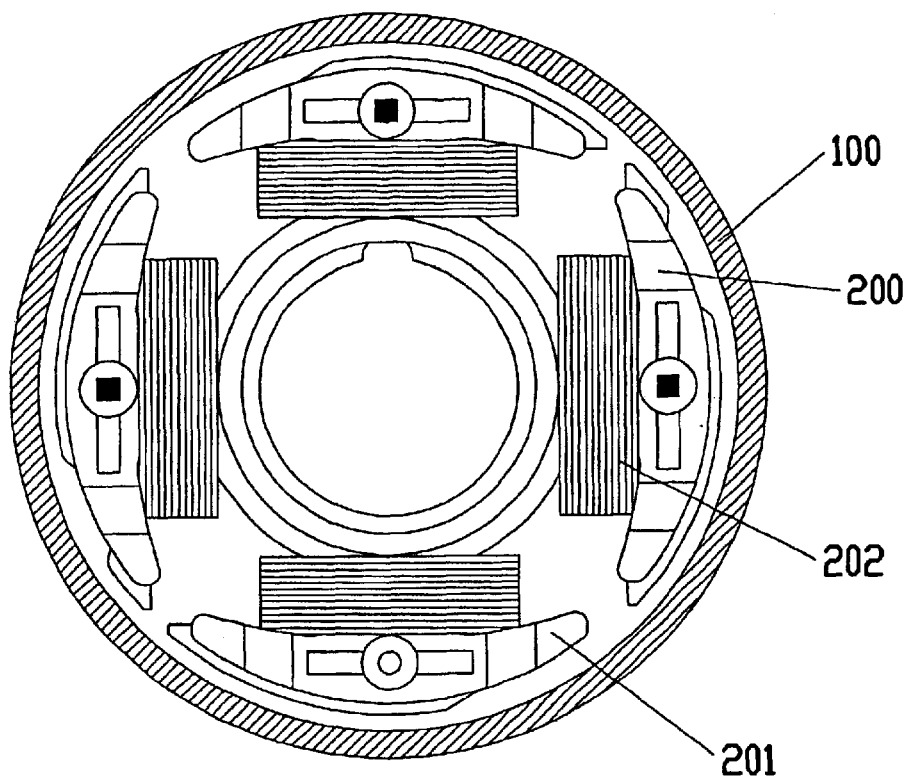
FIG. 1 is a partial cross-sectional view illustrating a conventional motor structure.
Figure 2:
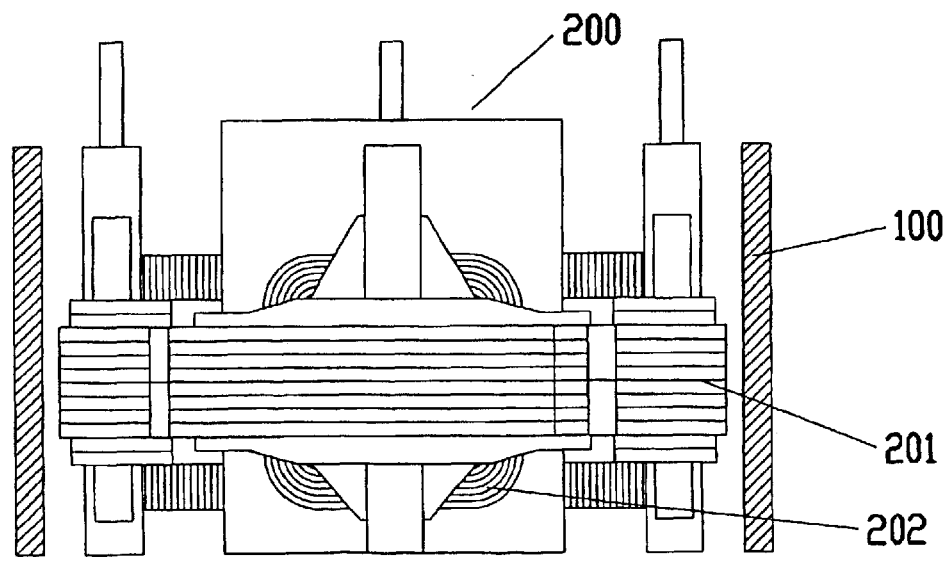
FIG. 2 is a side view illustrating the motor structure shown in FIG. 1.
Figure 3:
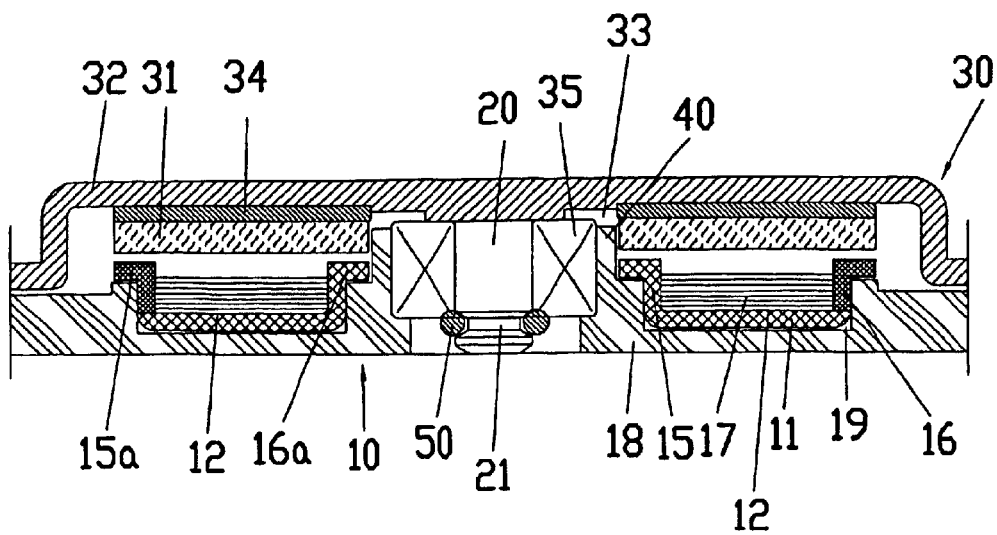
FIG. 3 is a partial cross-sectional view illustrating a motor structure in accordance with the preferred embodiment of the invention.

FIG. 3 is a partial cross-sectional view of the motor structure in accordance with a preferred embodiment of the invention. Referring to FIG. 3, the motor structure includes a stator 10 and a rotor 30. The stator 10 includes a coil seat 11 and a base 18. A concavity 19 is optionally formed in the base 18 for the coil seat 11 to be mounted therein. The coil seat 11 is composed of a bottom plate 12, a plurality of first teeth 15 and a plurality of second teeth 16. The first teeth 15 are vertically formed around the inner periphery of the bottom plate 12 and serve as the silicon steel having the first polarity. The second teeth 16 are vertically formed around the inner periphery of the bottom plate 12 and serve as the silicon steel having the second polarity.

Still referring to FIG. 3, in the preferred embodiment, each of the first teeth 15 faces to the space between the adjacent second teeth 16 such that the bottom plate 12, the first teeth 15 and the second teeth 16 define a coil seat 11 having a coil 17 formed therein.

Figure 4:
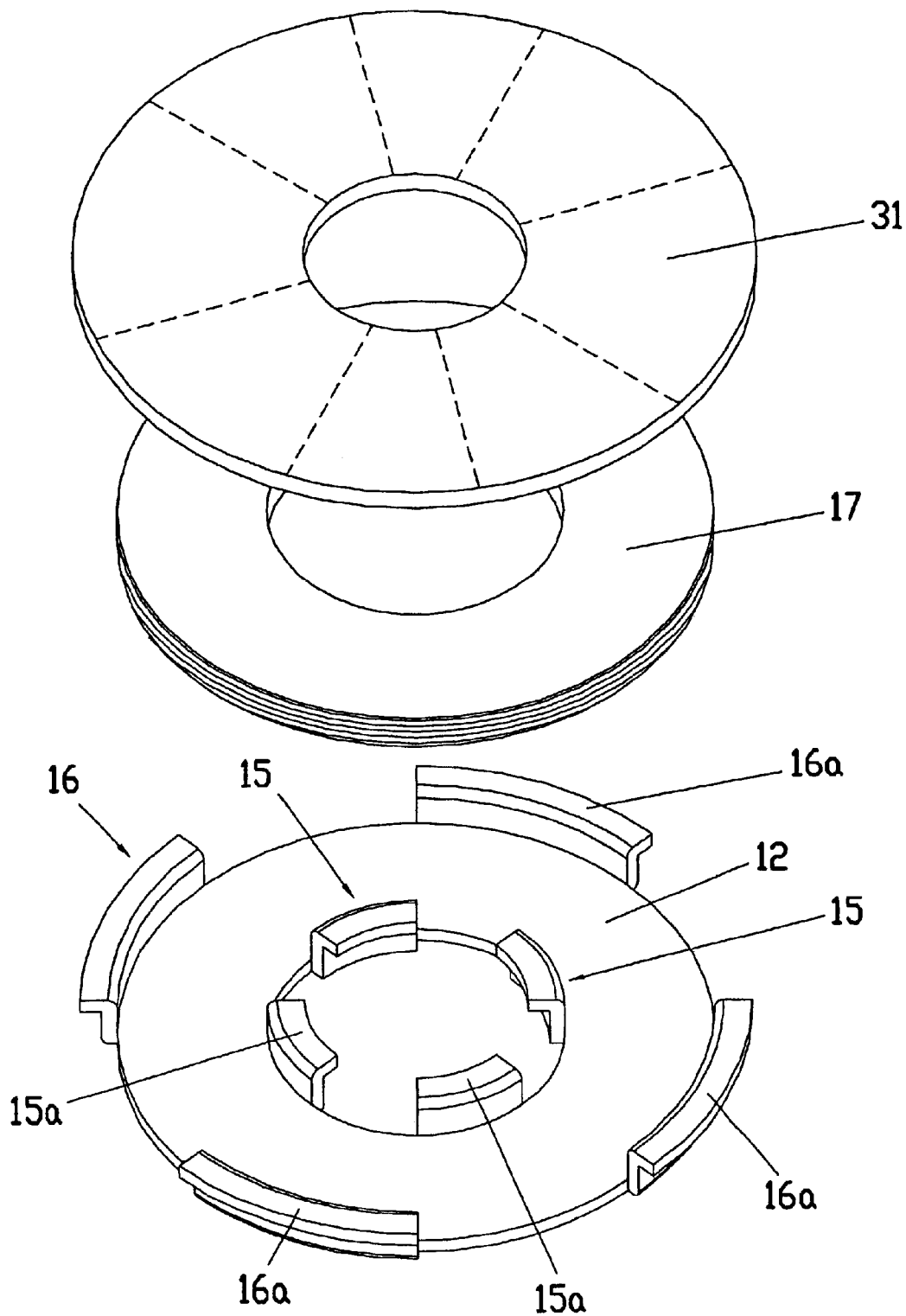
FIG. 4 is a partial exploded view illustrating the motor structure in accordance with the preferred embodiment of the invention.

Referring to FIG. 3 or FIG. 4, each of the first teeth 15 further includes a first extending portion 15a. The first extending portion 15a located in the terminal where the first teeth 15 do not connect with the bottom plate 12. Besides, the extending portion 15a extends toward the center of the bottom plate 12. That is, each of the first teeth 15 substantially is reversed L-shaped. Similarly, each of the second teeth 16 further includes a second extending portion 16a. The second extending portion 16a located in the terminal where the second teeth 16 do not connect with the bottom plate 12. Besides, the second extending portion 16a extends toward the direction away from the center of the bottom plate 12. That is, each of the second teeth 16 substantially is reversed L-shaped. Furthermore, the rotor 30 includes a circuit magnet 31 located above the coil 17, the first extending portion 15a and the second extending portion 16a.

The Second Embodiment

Figure 5:
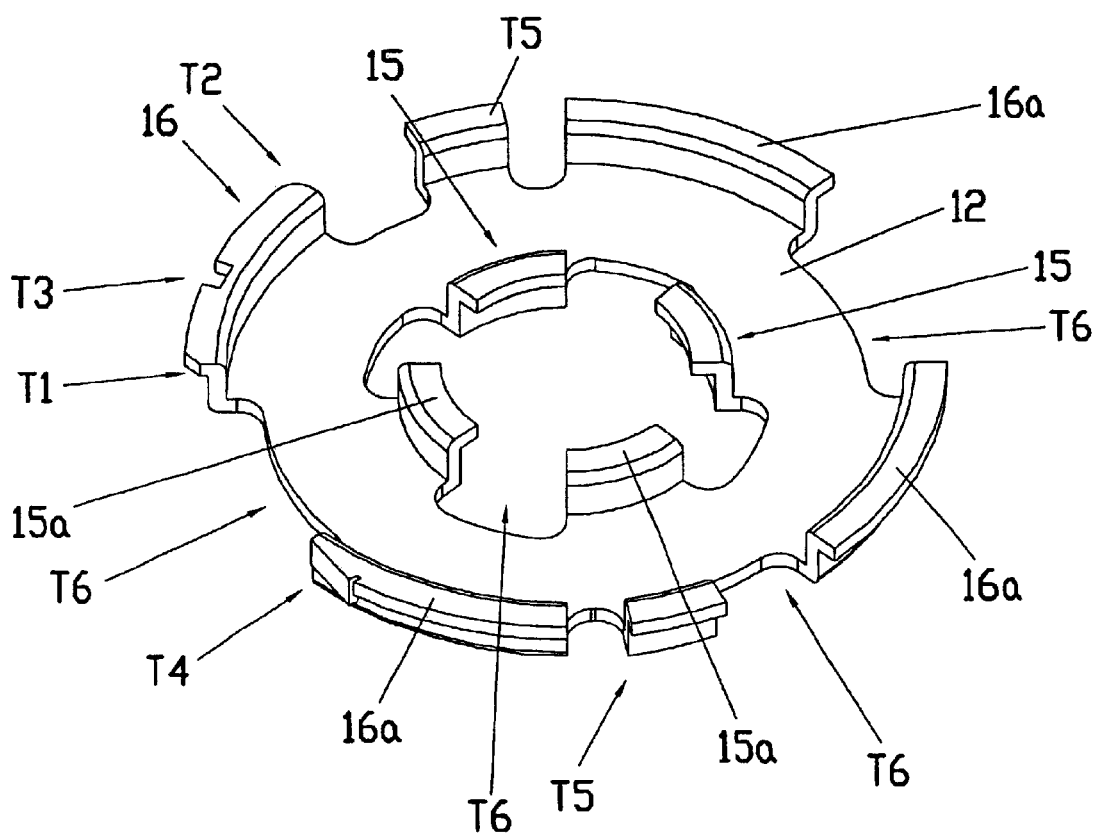
FIG. 5 illustrates a coil seat in accordance with the another preferred embodiment of the invention.

FIG. 5 illustrates another preferred embodiment of the invention. The references 15, 15a, 16 and 16a refer to the same elements shown in FIG. 4, respectively. However, the second embodiment further optionally includes at least one chamfer T1, at least one fillet T2, at least one clearance T3, at least one fold T4, the first and second extending portions having different dimension, and at least one gap T6. In order to advantageously adjust the angle of magnetic inclination to start the motor, each of the first extending portion 15a and the second extending portion 16a further includes a chamfer T1, a fillet T2, a clearance T3, a fold T4 and different dimension T5. The bottom plate 12 further includes at least one gap T6 for accommodating a sensor device (not shown) so that the sensor device being beneath the circular magnet 31, as shown in FIG. 3.

Referring again to FIG. 3, the stator 30 further includes a shaft 20 substantially perpendicular to, and fixed on the base 18. A ring-shaped groove 21 is formed on the shaft 20. The rotor also includes a hub (e.g. a hub of an impeller) 32, a metal sheet (e.g. an iron sheet) 34, and a bearing 35. The metal sheet 34, arranged between the hub 32 and the circular magnet 31, is used to avoid magnetic leakage. The bearing 35 is penetrated by the shaft 20. The motor structure may further include an engagement ring (e.g. a copper sleeve) 40 and an elastic ring (e.g. an O-ring) 50. The engagement ring 40 is positioned on the bearing 35 for fixing the bearing 35. The elastic ring 50 is positioned in the ring-shaped groove 21 for elastically fixing the bearing 35. The engagement ring 40 and the elastic ring 50 are used to fix the bearing 35 so as to prevent the bearing 35 and the shaft 20 form separating along the axial direction of the shaft 20.

Referring to FIG. 4, which illustrating an exploded view of the coil seat 11, the coil 17 and the circuit magnet 31 shown in FIG. 3. The structure of the coil seat 11 can be clearly seen with reference to FIG. 4. The cross-section of the first teeth 15 substantially is reversed L-shaped. Similarly, the cross-section of the first teeth 16 substantially is reversed L-shaped. Furthermore, the above-mentioned circuit magnet 31 dose not locate only above the coil 17, but also above the first extending portion 15a and the second extending portion 16a. In this manner, while the motor structure is static, the static magnetic force between the circuit magnet 31 and the coil seat 11 improves the verticality of the shaft. As a result, the required current or power for starting the motor and vibration can be reduced significantly.

Figure 6:
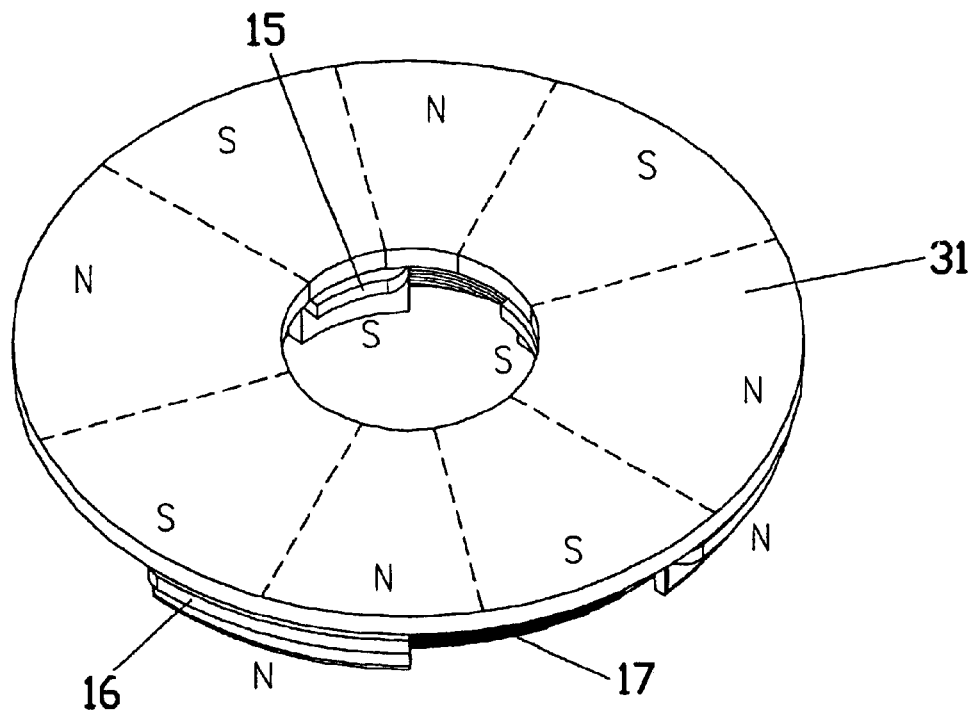
FIG. 6 illustrates a partial operating condition of the motor structure shown in FIG. 3 or FIG. 5, and some magnetization configuration of the circular magnet.

FIG. 6 shows a partial operating condition of the motor structure shown in FIG. 4 or FIG. 5. Referring to FIG. 6, the circular magnet 31 is magnetized to form even-numbered magnetic section. Besides, the polarities of the adjacent magnetic sections are different. When starting the motor, the first teeth 15 have the first polarity, such as S polarity, and the second teeth 16 have the second polarity, such as N polarity.

For the sake of understanding the invention, a description is given with reference to the first tooth 15-1, the second tooth 16-1, the magnetic section 31-1, and the magnetic section N or S indicated in the drawing. In the case, the first tooth 15-1 repels the magnetic section 31-1. Therefore, the circular magnet 31 turns in a predetermined angle in a counterclockwise direction, as indicated by the arrow. Then, the current flowing through the coil is inverted such that the first teeth 15 and the second teeth 16 are magnetized as the magnetic section having N polarity and the magnetic section having S polarity, respectively. As a result, the circular magnet 31 turns along the direction of the arrow under the influence of the repelling of the first teeth 15 and the attraction of the second teeth 16.

Figure 7:
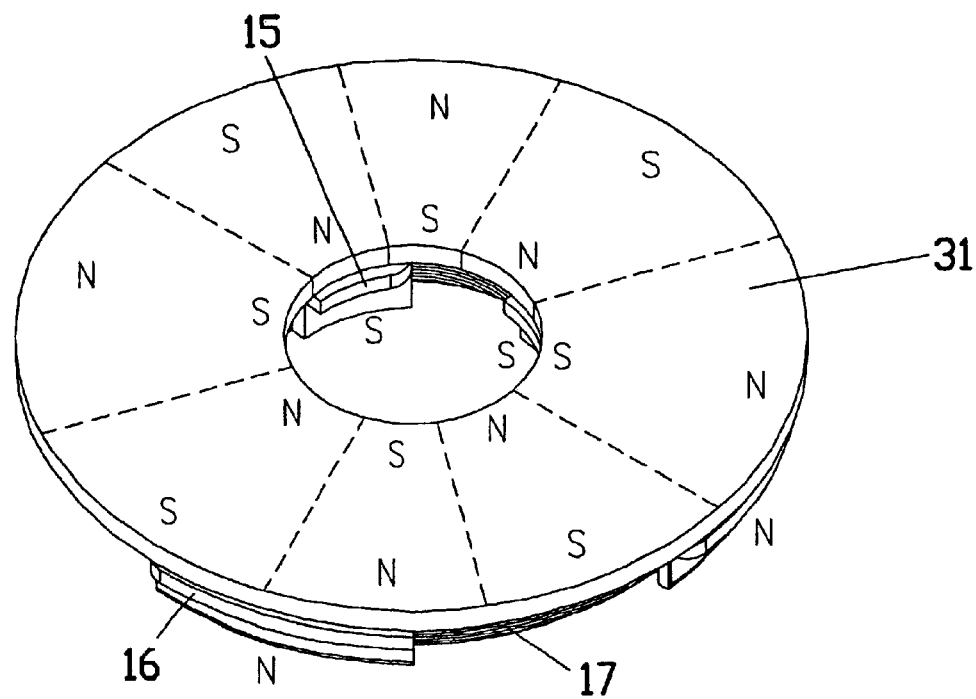
FIGS. 7–9 illustrates another magnetization configurations of the circular magnet according to the present invention.
Figure 8:
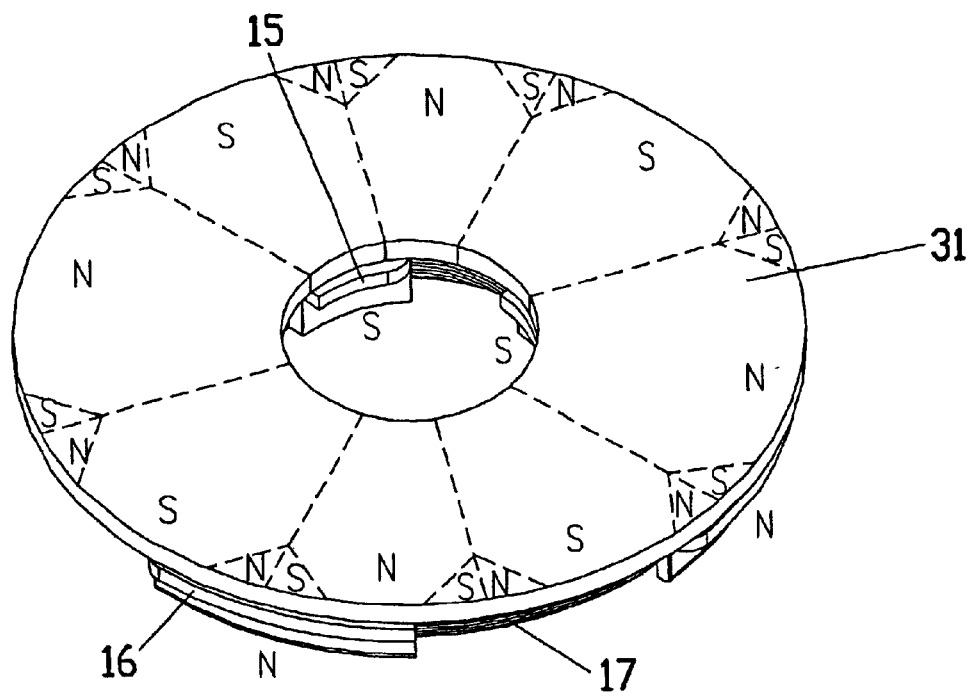
Figure 9:
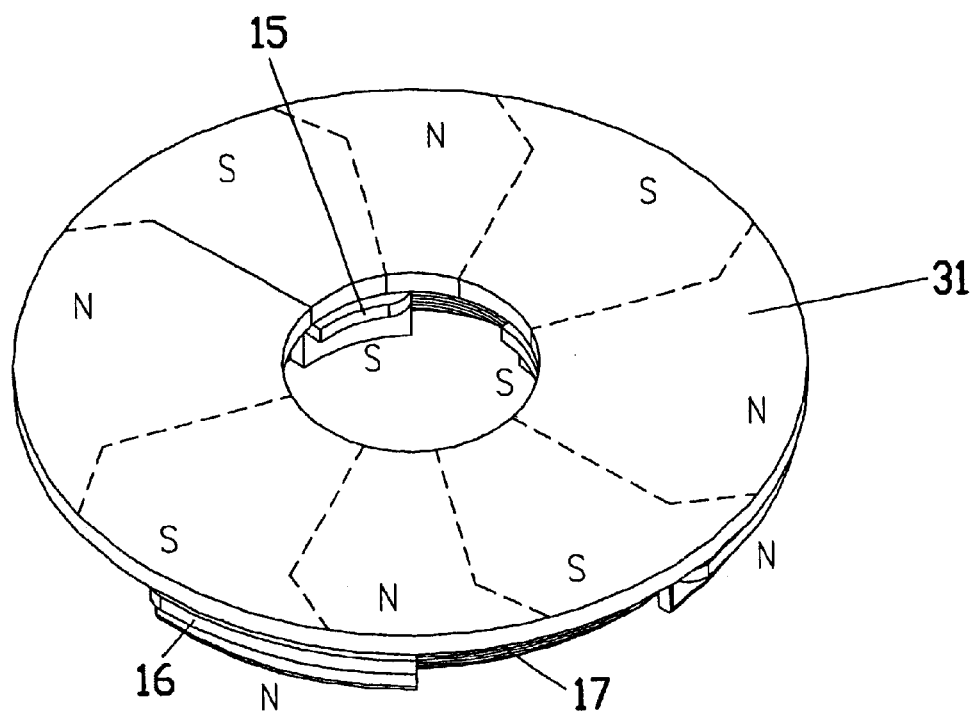

Furthermore, FIGS. 7–9 illustrated another magnetization configurations of the circular magnet 31. As shown in FIG. 7, the circular magnet 31 is magnetized to form even-numbered fan-shaped sections, such as 8 fan-shaped sections. Each of the fan-shaped sections has two different polarities. Besides, the arrangement for polarities of the adjacent fan-shaped sections is opposite. For example, if some fan-shaped section has S-N arrangement for polarities, the adjacent fan-shaped section has N-S arrangement for polarities.

As shown in FIG. 8, the circular magnet 31 is magnetized to form even-numbered main magnetic sections, such as 8 main magnetic sections. Besides, the polarities of the main magnetic sections are opposite. Furthermore, each of the main magnetic sections has a secondary magnetic section formed in the outer periphery close to the boundary between adjacent main magnetic sections. Besides, the polarity of the main magnetic sections is opposite to that of the secondary magnetic section. The main magnetic section indicates the magnetic section occupies larger area.

As shown in FIG. 9, the circular magnet 31 is magnetized to form even-numbered magnetic sections, such as 8 magnetic sections. The polarities of the adjacent magnetic sections are opposite. Besides, each of the magnetic sections is substantially propeller-blade-shaped.

Since the coil 17 is directly wound in the coil seat 11 defined by the bottom plate 12, the first teeth 15 and the second teeth 16, the winding is easy and there does not exist the problem of wasting the winding space as illustrated in the prior art. Furthermore, the coil seat 11 has no sharp edges exist to damage the coil 17 in accordance with the present invention. Moreover, since the winding is simplified in the present invention, the number of the poles can be increased so as to improve the stability of the motor.

Furthermore, another advantages of the present invention are described as follows. For example, according to the present invention, the effective area between the circular magnet 31 and the coil seat 11 is increased such that the verticality of the shaft can be improved by the static magnetic force between the circular magnet 31 and the coil seat 11. In this case, the current or power required for starting the motor can be reduced significantly.

Figure 10:
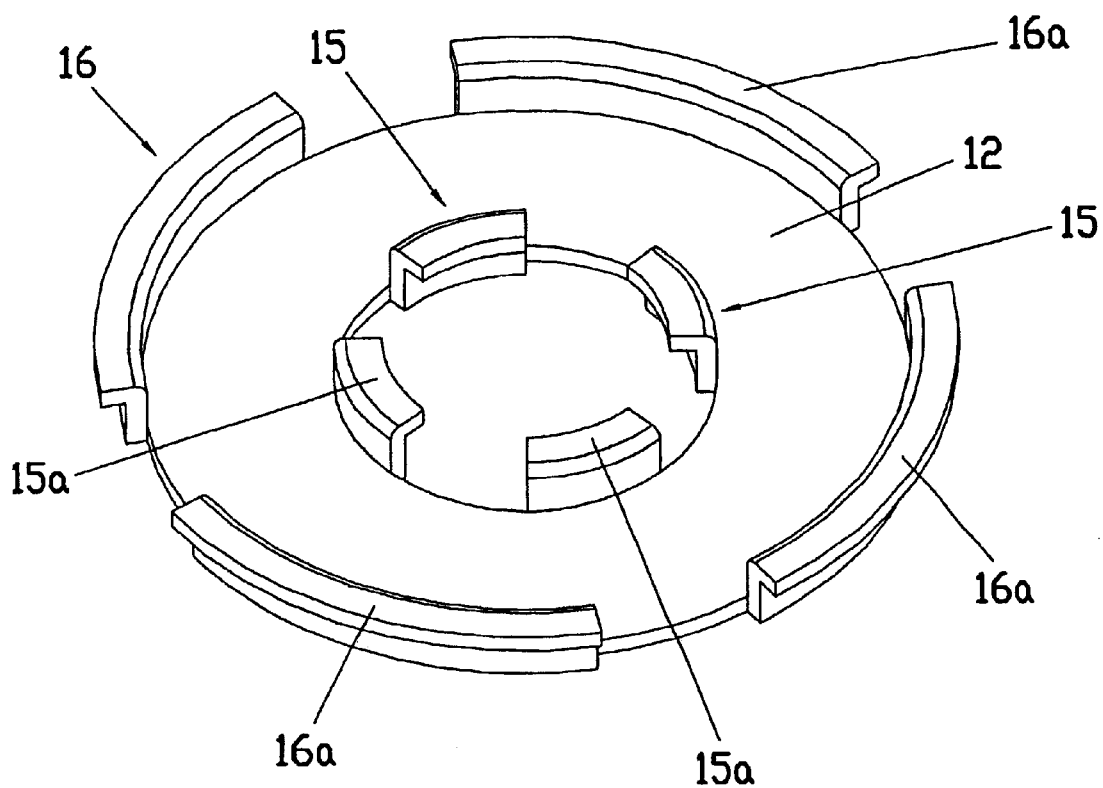
FIG. 10 illustrates a coil seat in accordance with the preferred embodiment of the invention.

Although the coil seat shown in FIGS. 3–5 has the structure that the first teeth 15 face to the space between the adjacent second teeth 16, the coil seat shown in FIG. 10 having the structure that the first teeth 15 partially face to the second teeth 16 is also permitted.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. For example, the concavity can be omitted such that the coil seat is directly formed on the base.

What is claimed is:

1. A motor structure, comprising:
    a stator, further comprising;
    a bottom plate;
        a plurality of first teeth formed around inner periphery of said bottom plate, said first teeth having a first extending portion extending toward the center of said bottom plate;
        a plurality of second teeth formed around outer periphery of said bottom plate, said second teeth having a second extending portion extending away from the center of said bottom plate;
        wherein said bottom plate, said first teeth and said second teeth define a coil seat, a coil being formed in said coil seat; and
        a rotor, being coupled to said stator, said rotor having a circular magnet formed above said coil seat, said first extending portion and said second extending portion.

2. The motor structure according to claim 1, wherein said first extending portion further comprising a chamfer, a fillet, a clearance, a fold and different dimension.

3. The motor structure according to claim 1, wherein said second extending portion further comprising a chamfer, a fillet, a clearance, a fold and different dimension.

4. The motor structure according to claim 1, wherein said bottom plate further comprising at least one gap for accommodating a sensor device so that said sensor device being beneath said circular magnet.

5. The motor structure according to claim 1, wherein said first teeth corresponding to the space between said second teeth.

6. The motor structure according to claim 1, wherein said first teeth partially facing to said second teeth.

7. The motor structure according to claim 1, further comprises a base for accommodating said coil seat.

8. The motor structure according to claim 7, wherein:
    said rotor further comprising a shaft, said shaft having a ring-shaped groove;
    said stator further comprising:
        a hub;
        a metal sheet arranged between said hub and said circular magnet; and
        a bearing positioned in said base and penetrated by said shaft.

9. The motor structure according to claim 8, further comprising:
    an engagement ring for fixing said bearing; and
    an elastic ring positioned in said ring-shaped groove for elastically fixing said bearing.

10. The motor structure according to claim 1, wherein said circular magnet is magnetized to form even-numbered fan-shaped sections such that each of fan-shaped sections has two different polarities, said adjacent fan-shaped section having opposite arrangement of polarities.

11. The motor structure according to claim 1, wherein said circular magnet is magnetized to form even-numbered main magnetic sections such that adjacent main magnetic sections have different polarity, each of said main magnetic sections has a secondary magnetic section formed in the outer periphery close to the boundary between adjacent main magnetic sections, the polarities of said main magnetic sections are opposite to that of said secondary magnetic section.

12. The motor structure according to claim 1, wherein said circular magnet is magnetized to form even-numbered magnetic sections such that adjacent magnetic sections have different polarity and each of said magnetic sections is substantially propeller-blade-shaped.

* * * * *